S. C. DISTEFANO.
TROLLEY GUARD.
APPLICATION FILED FEB. 8, 1912.
1,040,904.
Patented Oct. 8, 1912.
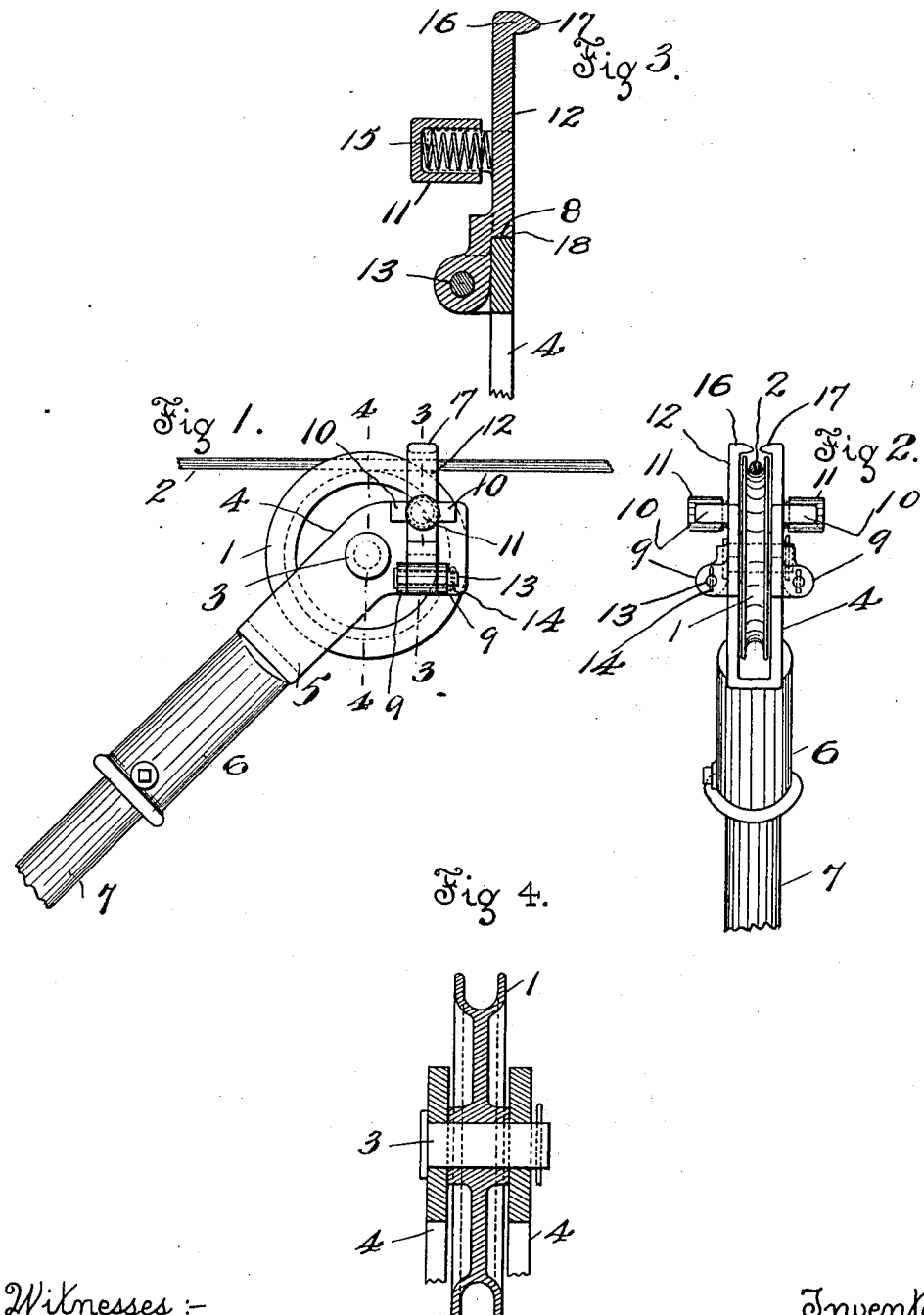

UNITED STATES PATENT OFFICE.

SAMUEL C. DISTEFANO, OF BALTIMORE, MARYLAND.

TROLLEY-GUARD.

1,040,904.  Specification of Letters Patent.  Patented Oct. 8, 1912.

Application filed February 8, 1912. Serial No. 676,167.

*To all whom it may concern:*

Be it known that I, SAMUEL C. DISTEFANO, a citizen of the United States, residing at Baltimore, State of Maryland, have invented certain new and useful Improvements in Trolley-Guards, of which the following is a specification.

My invention relates to improvements in trolley guards, and is designed particularly for use with electric railway cars using the overhead trolley system.

The prime object of the invention is the provision of means for preventing the trolley wheel of an electric car from leaving the wire or conductor in accidental manner, as for instance when rounding a curve on the road, or at other places where the wheel is likely to be displaced from contact with the conductor or wire.

The invention consists essentially of a pair of pivoted and spring pressed guard arms or levers, and in the particular construction and arrangement of these guards in their relation to the trolley harp.

By the utilization of my device as hereinafter described, a simple, inexpensive, durable, and compact device is provided that will accomplish the purposes and results of a comparatively perfect trolley guard.

In the drawings I have illustrated one example of the physical embodiment of my invention constructed according to the simplest and best mode I have so far devised for the practical application of the principles.

Figure 1 is a side view showing my invention embodied and in use with a trolley wheel. Fig. 2 is a rear end view looking from the right in Fig. 1. Fig. 3 is a sectional view on line 3—3 Fig. 1. Fig. 4 is a sectional view on line 4—4 Fig. 1.

I have illustrated my device as applied to the usual or standard construction of contact device which comprises the trolley wheel 1 adapted to travel in contact with the conductor wire 2, the wheel being supported on its shaft 3 journaled in the forked ends 4, 4, of the trolley harp 5. The harp is attached as usual, by means of the socket 6 to the upper end of the pole 7, the latter being connected with the roof of a railway car in any suitable manner.

The device may be applied to trolley harps already in use, with but slight alteration, or a specially designed harp may be used, but as illustrated in the drawings, each fork of the harp is cut away to form an open slot 8, 8, and just below the lower end of the slot, on the outside of the forked end is formed a pair of integral perforated ears 9. At the upper open end of the slot 8, and at each side thereof, projects a boss 10, with which is integrally formed a cup or socket 11, which latter bridges the slot 8. These elements I have shown as integral with the forked arms of the trolley, but it will be understood that they may be bolted to the arms, as separate pieces if desired.

At the outside of each forked end of the harp is pivoted a guard arm 12, a bolt 13 being passed through the perforated end of the arm and also between the pairs of perforated ears 9 of the forked end of the harp, a cotter 14 serving to secure the bolt.

As clearly seen in Fig. 3, the body of the guard arm is not on the same vertical plane with the pivot bolt, but is inset, and when in proper location fills the slot 8 of the forked trolley harp end. A spring 15 is incased within the cup or socket 11 and this spring bears against the guard arm and urges it toward the wheel at all times.

The upper end of each guard arm is formed with a turned in end 16 which is pointed, as at 17, and these ends project over the periphery of the trolley wheel and also over the wire or conductor 2, to form a guard against the displacement of the wheel from the wire. Thus the pointed ends 16 of the guard arms will hold the wheel applied to the conductor 2, and the springs 15 form an elastic medium for holding the guard arms in proper position. When disengaging the trolley from the wire, the arms may be moved or swung outwardly on their pivots, against the springs 15, to free the trolley from the wire.

To prevent the springs forcing the guard arms against the wheel, a shoulder 18 is provided on each arm which engages the forked end at the lower side wall of the slot 8.

Having thus fully described my invention, what I claim as new and desire to secure by Letters Patent is:—

1. The combination with a trolley wheel, and the forked ends of the supporting harp formed with recesses or slots, of a guard arm pivoted at each side of the harp and said arms seated in said slots, an integral cup formed on each forked end and located over one of said slots, and a coiled spring in said cup bearing against the guard arm.

2. The combination with the slotted forked ends of a supporting harp and a trolley wheel, an integral cup formed at the outside of each harp end and located over a slot, a guard arm pivoted on each forked end and located in a slot, a shoulder on the arm bearing against a wall of the slot, and a spring inclosed in said cup bearing on said arm.

3. The combination with the slotted forked ends of a supporting harp, and a trolley wheel, an integral cup formed at the outside of each forked end and located over a slot, a guard arm formed with a hooked end and pivoted at its other end on each forked end, and located in a slot, a shoulder on the arm bearing against a wall of the slot, and a spring inclosed in said cup bearing on said arm.

In testimony whereof I affix my signature in presence of two witnesses.

SAMUEL C. DISTEFANO.

Witnesses:
W. T. DIETRICH,
ELMER E. KNIGHT.

---

Copies of this patent may be obtained for five cents each, by addressing the "Commissioner of Patents, Washington, D. C."